United States Patent Office.

CHARLES E. L. HOLMES, OF NEW YORK, N. Y.

Letters Patent No. 109,009, dated November 8, 1870.

IMPROVEMENT IN THE PREPARATION OF PEAT.

The Schedule referred to in these Letters Patent and making part of the same.

*To all whom it may concern:*

Be it known that I, CHARLES E. L. HOLMES, of the city and State of New York, have invented an Improvement in the Preparation of Peat, and the following is declared to be a correct description thereof.

Peat, when cut and exposed to the action of the atmosphere and sun-light, becomes broken in drying, and is not adapted to use as fuel.

Efforts have been put forth to consolidate the peat by pressure after it is cut, but, in consequence of the elastic nature of the peat, these efforts have not been practically successful, and attention has been turned from the molding and pressing to devices for speedily drying the peat.

During the most favorable weather peat cannot (as now mixed and molded) be successfully dried simply in the atmosphere, and artificial heat is expensive; and in winter weather the drying of peat in the atmosphere is almost impossible.

The object of my invention is to overcome the difficulties heretofore experienced and make the manufacture of peat-fuel a certain and regular business during the entire year.

I have the peat cut from the bog in blocks or lumps and expose the same to atmospheric action, and, owing to its fibrous and porous nature, the same will become dry and crisp, but it is not adapted to fuel on account of its loose porous nature.

I accumulate from time to time whatever quantity of this dry porous peat may be required, and at such seasons as will most facilitate its production.

In the preparation of peat for the market or for use I supply into the mixing-machine (which may be of any desired or known character) the wet peat as it is cut from the bog, together with a sufficient quantity of the dry peat aforesaid to absorb the surplus moisture, so that the plastic mass issuing from the machine and cut into blocks will be of a consistency to be easily handled without injury, and piled up for drying in the open air or under sheds, and the same will dry and harden without further labor or trouble.

In this mode of preparing peat the mass becomes sufficiently solid to dry hard, because the necessary proportion of solid matter is supplied to the water; so that instead of attempting to remove the surplus water by artificial means the addition of solid matter in the form of the loose dry peat produces the proper relative proportion of solid matter to the moisture to cause the peat to mold and cut properly, and dry without being porous and easily broken.

I claim as my invention—

The method herein specified of preparing peat for fuel, by mixing with the wet peat dry peat, as specified, and for the purposes set forth.

Signed by me this 13th day of October, A. D. 1870.

CHAS. E. L. HOLMES.

Witnesses:
GEO. D. WALKER,
GEO. T. PINCKNEY.